(12) United States Patent
Jo et al.

(10) Patent No.: US 8,977,009 B2
(45) Date of Patent: Mar. 10, 2015

(54) BIOMETRIC AUTHENTICATION DEVICE, BIOMETRIC AUTHENTICATION PROGRAM, AND BIOMETRIC AUTHENTICATION METHOD

(75) Inventors: Yuka Jo, Kawasaki (JP); Takahiro Aoki, Kawasaki (JP); Soichi Hama, Atsugi (JP); Mitsuaki Fukuda, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 13/614,270

(22) Filed: Sep. 13, 2012

(65) Prior Publication Data

US 2013/0011015 A1    Jan. 10, 2013

Related U.S. Application Data (63) Continuation of application No. PCT/JP2010/055519, filed on Mar. 29, 2010.

(51) Int. Cl.
  *G06K 9/00* (2006.01)
  *G06K 9/32* (2006.01)

(52) U.S. Cl.
  CPC .......... *G06K 9/3233* (2013.01); *G06K 9/00013* (2013.01)
  USPC .......................................... 382/115; 382/283

(58) Field of Classification Search
  CPC ............ G06K 9/00013; G06K 9/2027; G06K 9/3233; G06K 9/4661; G06T 2207/10141; G06T 2207/10152
  USPC .......................... 382/115, 124, 274, 282, 283
  See application file for complete search history.

(56) References Cited

U.S. PATENT DOCUMENTS

2008/0231564 A1*   9/2008   Harada et al. ................... 345/81

FOREIGN PATENT DOCUMENTS

| JP | 2003-242487 A | 8/2003 | ................ G06T 1/00 |
| JP | 2007-115072 A | 5/2007 | ................ G06T 1/00 |
| JP | 2007-272527 A | 10/2007 | ................ G06T 1/00 |
| JP | 2009-32116 A | 2/2009 | ................ G06T 7/00 |

OTHER PUBLICATIONS

International Search Report of Corresponding PCT Application PCT/JP2010/055519 mailed May 11, 2010.
Office Action mailed Oct. 8, 2013 in corresponding Japanese Application No. 2012-507927.
(Continued)

*Primary Examiner* — Andrew W Johns
(74) *Attorney, Agent, or Firm* — Staas & Halsey LLP (57) ABSTRACT

A biometric authentication device that authenticates a user using biological features of the user, the biometric authentication device includes: an illumination unit configured to illuminate a target which represents the biological features; an image sensor configured to obtain a first captured image by capturing the target illuminated by the illumination unit, and obtain a second captured image by capturing the target not illuminated by the illumination unit; an acquisition unit configured to acquire from a storage unit a mask which has a target area approximating the shape of the target in the first and second captured images obtained by the image sensor; and a detection unit configured to detect light other than illumination light illuminated by the illumination unit based on the mask acquired by the acquisition unit and at least one of the first and second images.

15 Claims, 11 Drawing Sheets

(56) References Cited

OTHER PUBLICATIONS

English abstract and machine translation of Japanese Patent Publication No. 2007-272527, May 10, 2007.
English abstract and machine translation of Japanese Patent Publication No. 2007-115072, Oct. 18, 2007.
English abstract and machine translation of Japanese Patent Publication No. 2003-242487, Aug. 29, 2003.
Notification of Transmittal of the International Preliminary Report on Patentability mailed Nov. 1, 2012 in corresponding International Application No. PCT/JP2010/055519.

* cited by examiner

EVALUATION TARGET

| SURVEY RESULT INFORMATION | |
|---|---|
| REFLECTION | B |
| INTENSITY OF EXTERNAL LIGHT | B |
| TIME CHANGE OF EXTERNAL LIGHT | A |
| UNDESIRED CAPTURING | C |

BIOMETRIC AUTHENTICATION DEVICE, BIOMETRIC AUTHENTICATION PROGRAM, AND BIOMETRIC AUTHENTICATION METHOD

CROSS-REFERENCE TO RELATED APPLICATION

This application is a continuation application of International PCT Application No. PCT/JP2010/055519, filed on Mar. 29, 2010, the entire contents of which are incorporated herein by reference.

FIELD

The technology disclosed in this specification relates to a biometric authentication device, a biometric authentication program, and a biometric authentication method.

BACKGROUND

Biometric authentication for identity verification which is performed by capturing a biological feature of a user with a camera and comparing the feature with a registration template as the user biological feature registered in advance is known as a authentication technique for identity verification. In order to capture an image appropriate for the authentication, the biometric authentication device for performing the biometric authentication includes a mechanism of adjusting the exposure of the camera and the intensity of the illumination provided for the biometric authentication device depending on the intensity of the external light to an object to be captured. In addition, the technology of surveying the installation environment of the biometric authentication device relating to the illumination when the registration template is registered or when the biometric authentication is performed, adjusting an image based on the result of the survey, and issuing a warning to a user is known.

However, according to the technology above, there is the problem that the result of the survey is subject to the influence from the fluctuation of the biological feature because the biological feature of a user is used in the survey of the installation environment of the biometric authentication. The fluctuation of the biological feature can be caused by a change of the state of the biological feature, and the displacement of the presentation position to the device.

DOCUMENTS OF PRIOR ART

Patent Document

Patent Document 1: Japanese Laid-open Patent Publication No. 2007-272527
Patent Document 2: Japanese Laid-open Patent Publication No. 2009-32116

SUMMARY

According to as aspect of the embodiments, a biometric authentication device that authenticates a user using a biological feature of the user, the biometric authentication device includes: an illumination unit configured to illuminate a target which represents the biological feature; an image sensor configured to obtain a first captured image by capturing the target illuminated by the illumination unit, and obtain a second captured image by capturing the target not illuminated by the illumination unit; an acquisition unit configured to acquire from a storage unit a mask which has a target area approximating a shape of the target in the first and second captured images obtained by the image sensor; and a detection unit configured to detect light other than illumination light illuminated by the illumination unit based on the mask acquired by the acquisition unit and at least one of the first and second images.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The embodiment of the present invention is described below with reference to the attached drawings.

Figure 1:
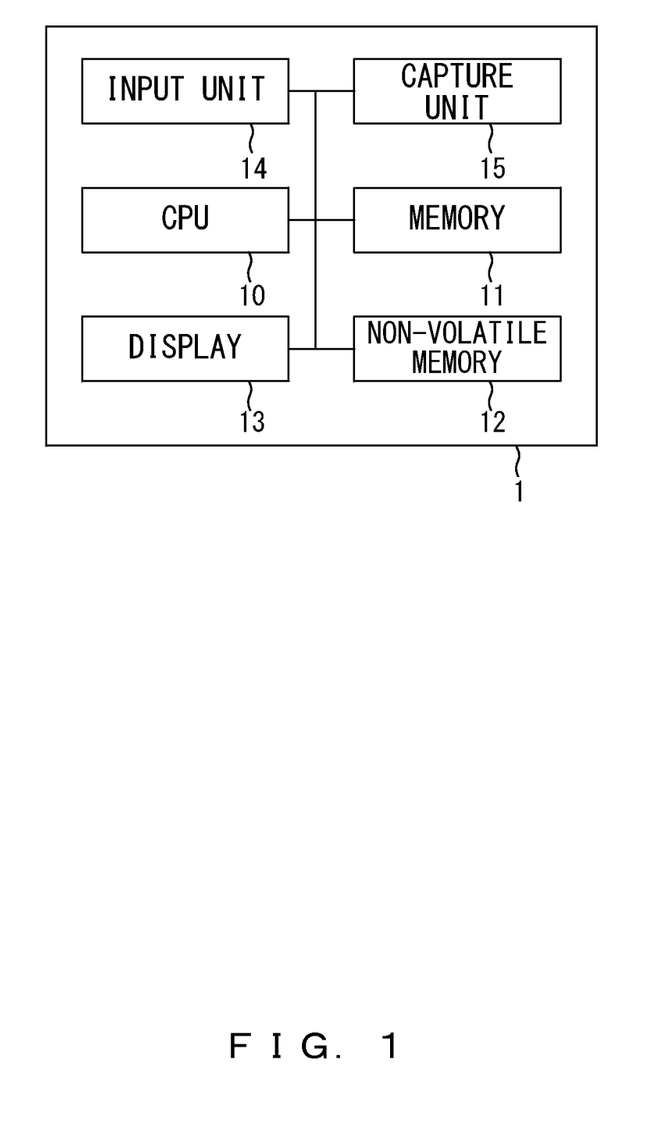
FIG. 1 is a configuration of the hardware of the biometric authentication device according to an embodiment of the present invention.
Figure 2:
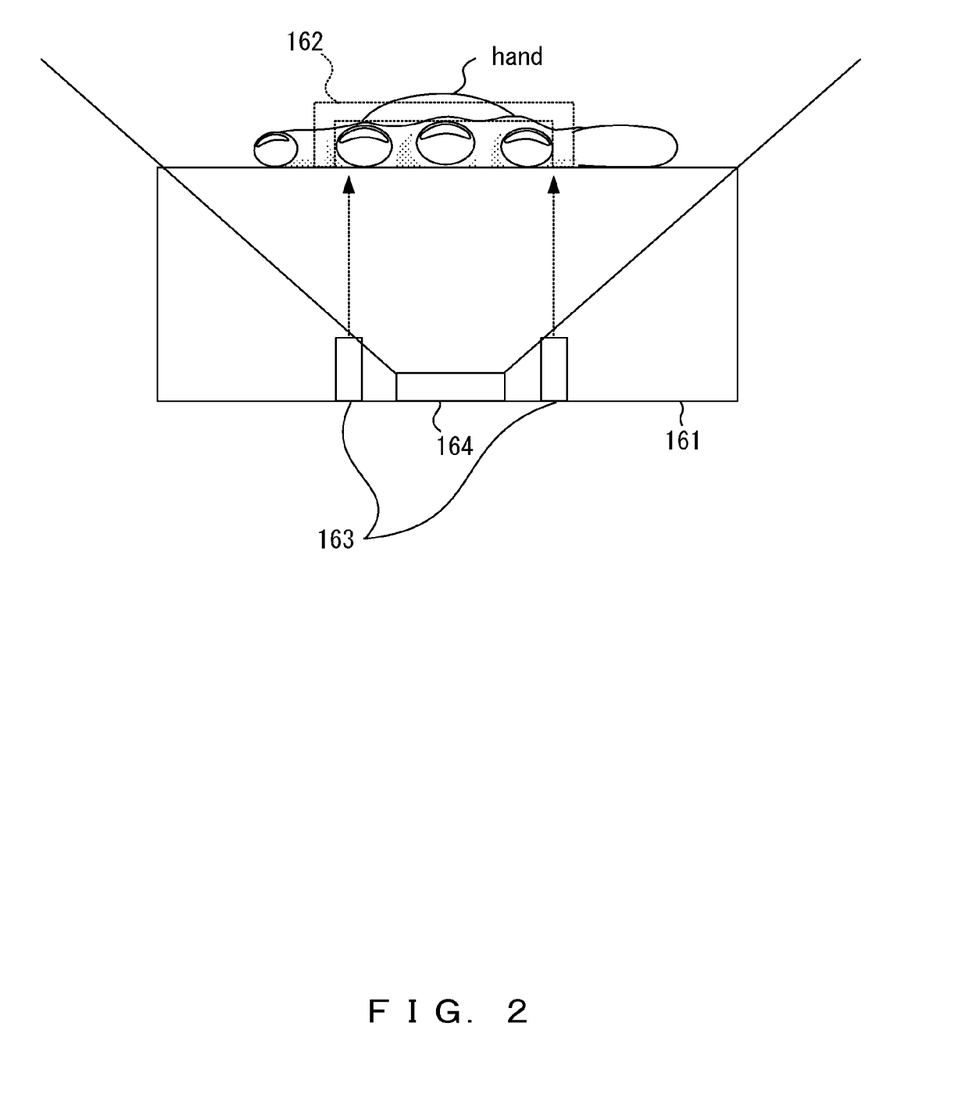
FIG. 2 is a configuration of the hardware of the capture unit.
Figure 3:
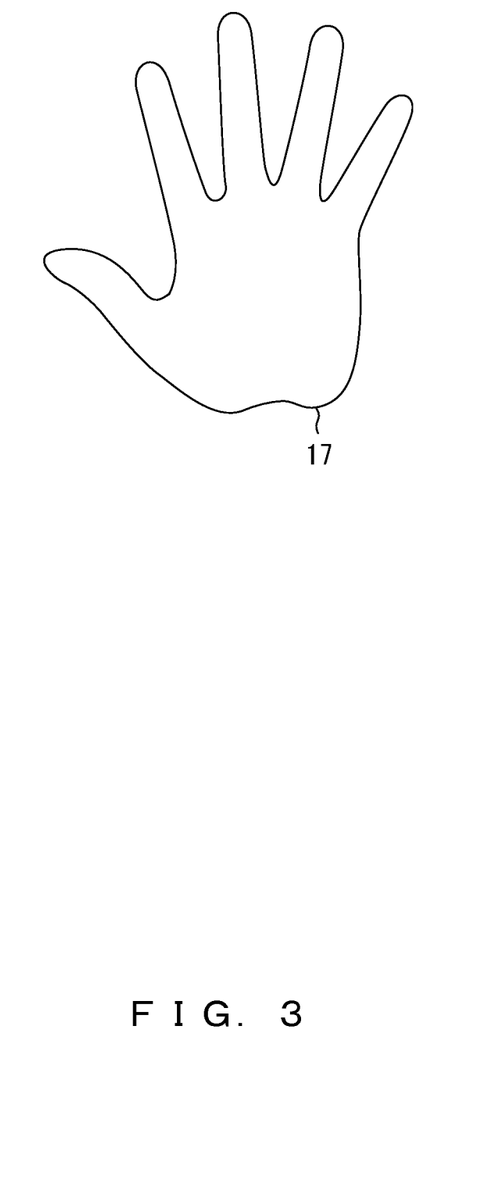
FIG. 3 illustrates an evaluation target.

The hardware configuration according to the present embodiment is first described below. FIG. 1 is a configuration of the hardware of the biometric authentication device according to an embodiment of the present invention. FIG. 2 is a configuration of the hardware of the capture unit. FIG. 3 illustrates an evaluation target.

A biometric authentication device 1 according to the present embodiment performs vein authentication on the palm of a user, and surveys an installation environment. As illustrated in FIG. 1, the biometric authentication device 1 includes a CPU (Central Processing Unit) 10, memory 11, non-volatile memory 12, a display 13, an input unit 14, and a capture unit 15. The CPU 10 controls the biometric authentication device 1. The memory 11 is a main memory directly accessed by the CPU 10. The non-volatile memory 12 stores a user ID and a registration template corresponding to the user ID, a first threshold, a second threshold, a third threshold, a fourth threshold, and an evaluation mask described later. It is assumed that each of the first through fourth thresholds is a parameter relating to the survey of the installation environment, has two values, and is determined based on the capture result in a standard environment. The non-volatile memory 12 can be a hard disk, flash memory, etc. The display 13 presents information to the user of the biometric authentication device 1. The input unit 14 is equipment with which the user of the biometric authentication device 1 inputs an ID. The input unit 14 can be a ten-key keypad, a keyboard, a touch panel, a reader of non-contact IC card on which an ID is recorded, etc.

As illustrated in FIG. 2, the capture unit 15 includes a casing 161, a guide 162, an illumination unit 163, and a camera 164. The guide 162 is provided on the casing, and introduces the palm of a user to the appropriate image-capturing position. The illumination unit 163 emits a near-infrared light to the palm of a user. The illumination unit 163 can be an LED. The sensor 164 receives the near-infrared light emitted from the illumination unit 163 and reflected by the palm, thereby capturing the vein image of the palm. The sensor 164 also captures the area including the palm and its vicinity. The sensor 164 can be a CMOS (Complementary Metal Oxide Semiconductor) image sensor, a CCD (Charge Coupled Device) image sensor, etc.

In addition, the biometric authentication device 1 surveys the installation environment using an evaluation target as illustrated in FIG. 3. The survey of the installation environment is made on four items, that is, the reflection, the intensity of the external light, the time change of the external light, and the undesired capturing. The reflection refers to a state in which the external light reflected by the casing 161, the desk, the wall, etc. in the vicinity of the biometric authentication device 1 illuminates the palm. The intensity of the external light refers to an intensity of the external light such as the sunlight, the illumination of an installation environment, etc. directly entering the sensor 164. The time change of the external light refers to a case in which the external light changes in a short time interval, for example, by opening and closing a blind near the biometric authentication device 1. The undesired capturing refers to a state in which an object other than the palm excluding the guide is captured near the palm and it is difficult to discriminate the object from the palm in the image. The evaluation target has an average feature of the palm as a biological feature. In particular, the evaluation target is generated based on the average of a plurality of palms relating to the shape, size, and reflectance. In addition, it is assumed that the evaluation target is fixed to a constant position relative to the sensor 164 by the guide 162. It is also assumed that the evaluation target has a plane approximating the shape of the averaged palm in a two-dimensional pattern. The evaluation target can be a three-dimensional pattern representing the average palm.

Figure 4:
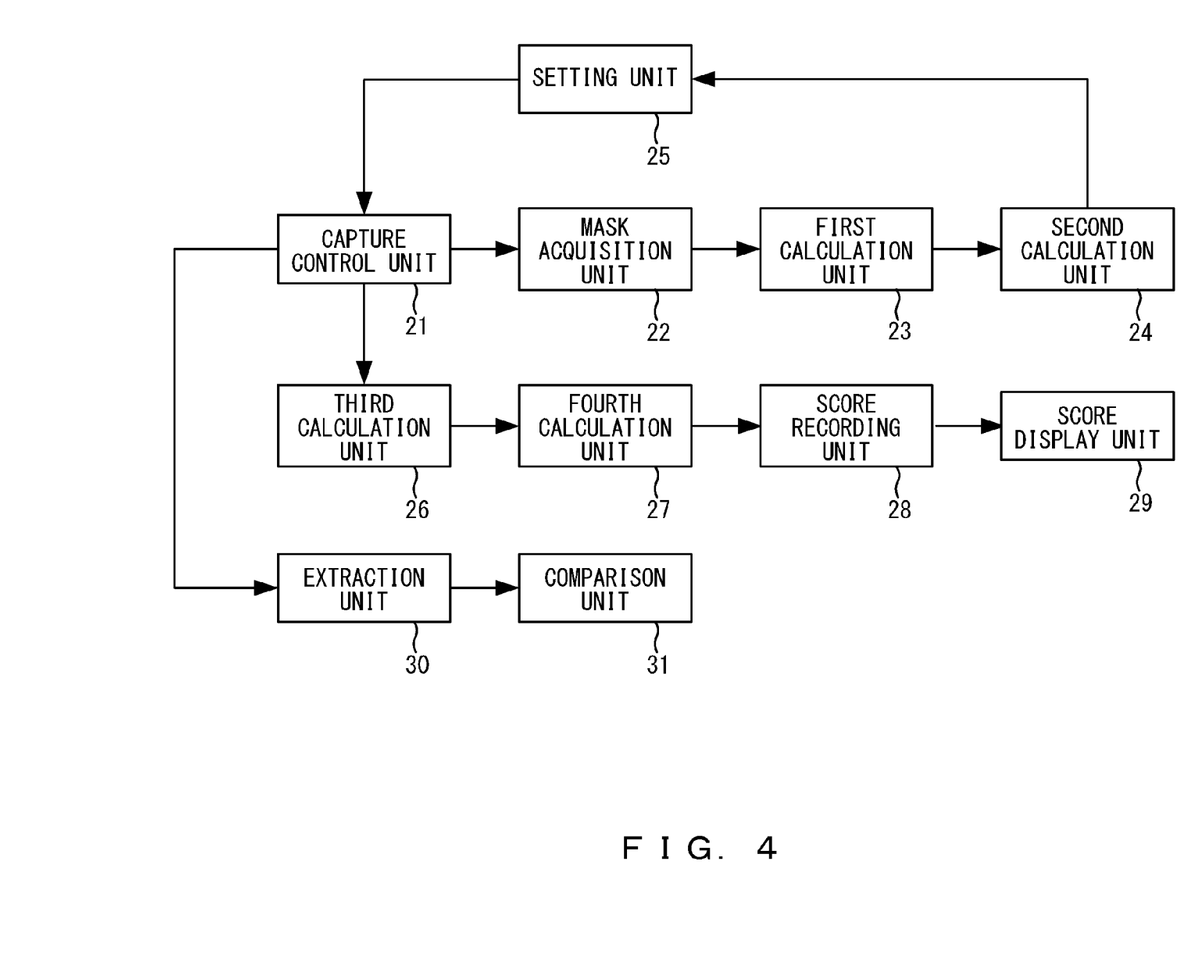
FIG. 4 is a configuration of the functions of the biometric authentication device according to an embodiment of the present invention.

Described next is the configuration of the functions of the biological authentication device according to the present embodiment. FIG. 4 illustrates a configuration of the functions of the biological authentication device according to the present embodiment.

As illustrated in FIG. 4, the biometric authentication device 1 includes as the functions a capture control unit 21, a mask acquisition unit 22, a first calculation unit 23, a second calculation unit 24, a setting unit 25, a third calculation unit 26, a fourth calculation unit 27, a score recording unit 28, a score display unit 29, an extraction unit 30, and a comparison unit 31. These functions are realized by the cooperation of the CPU 10 and the memory 11. The capture control unit 21 controls the capturing using the sensor 164, and the illumination unit 163 relating to the capturing. The mask acquisition unit 22 acquires an evaluation mask from the non-volatile memory 12. The evaluation mask indicates the target area as an area approximating the position and shape of the evaluation target in the captured image. The first calculation unit 23 calculates a reflection score as a parameter relating to the reflection using a first threshold. The second calculation unit 24 calculates an external light score as a parameter relating to the intensity of the external light using a second threshold. The setting unit 25 adjusts the sensibility of the sensor 164 and the quantity of illumination light of the illumination unit 163 based on the reflection score and the external light score. The third calculation unit 26 calculates an external light fluctuation score as a parameter relating to the change of the external light using a third threshold. The fourth calculation unit 27 calculates an undesired capturing score as a parameter relating to the undesired capturing using a fourth threshold. The score recording unit 28 records each score calculated by the first calculation unit 23, the second calculation unit 24, the third calculation unit 26, and the fourth calculation unit 27 in the non-volatile memory 12. The score display unit 29 displays each calculated score, and displays a message to a user based on each score. The extraction unit 30 extracts a vein pattern as a biological feature from the image of the palm captured by the sensor 164. The comparison unit 31 compares the registration template corresponding to the ID input to the input unit 14 with the vein pattern extracted by the extraction unit 30, and authenticates the user.

Figure 5:
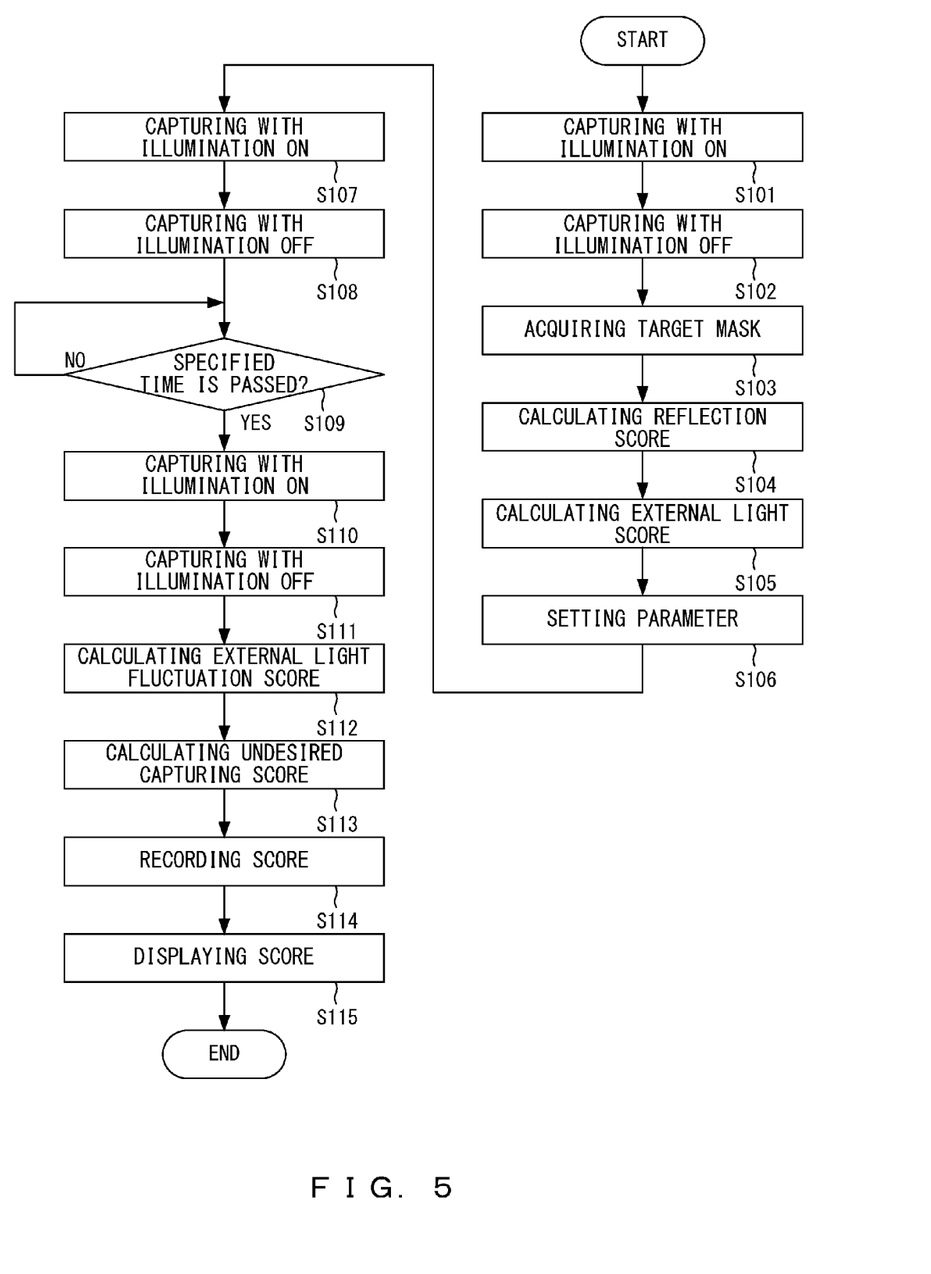
FIG. 5 illustrates an operation of the surveying process of the installation environment.
Figure 6:
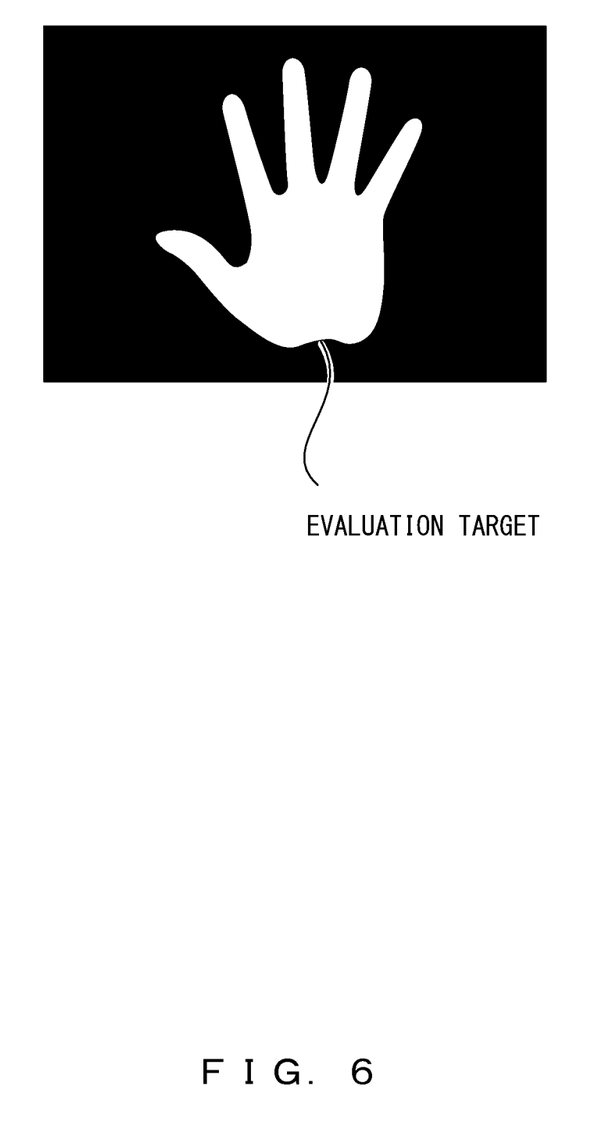
FIG. 6 is an ideal ON image.
Figure 7:
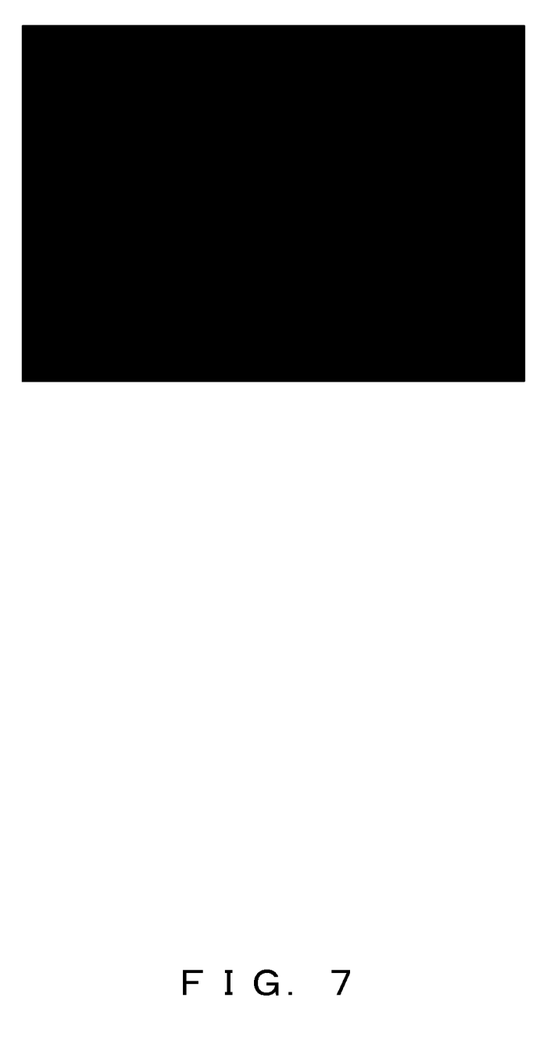
FIG. 7 is an ideal OFF image.
Figure 8:
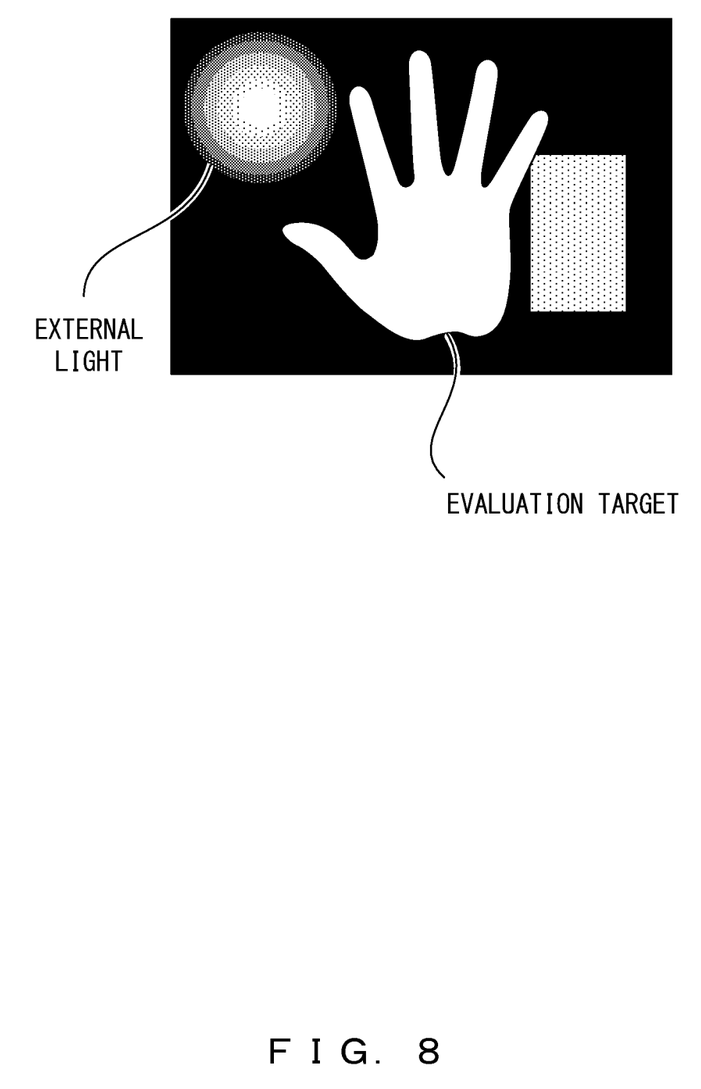
FIG. 8 illustrates the external light and undesired capturing in the ON image.
Figure 9:
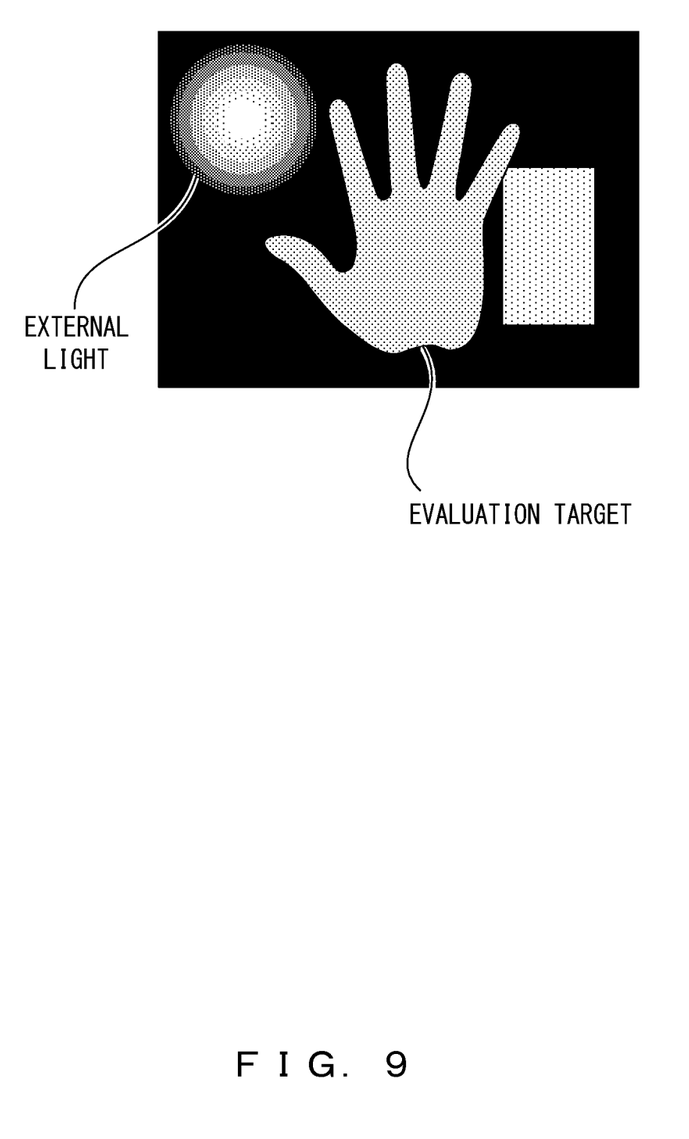
FIG. 9 illustrates the external light, undesired capturing, and reflection in the OFF image.
Figure 10:
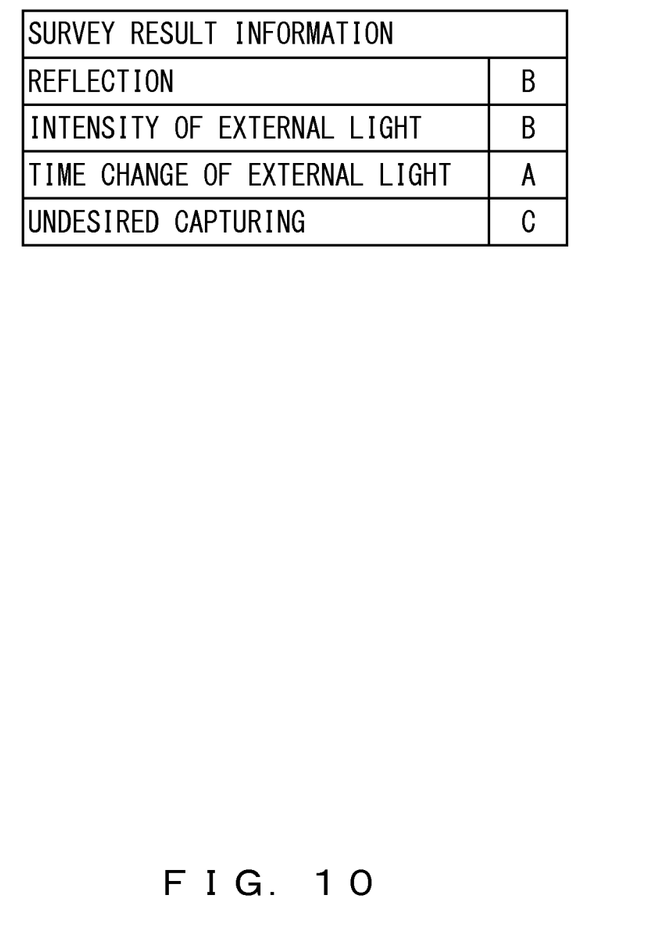
FIG. 10 illustrates the survey result information.

Described next is the operation of the surveying process of the installation environment of the biometric authentication device according to the present embodiment. FIG. 5 illustrates an operation of the surveying process of the installation environment. FIG. 6 is an ideal ON image. FIG. 7 is an ideal OFF image. FIG. 8 illustrates the external light and undesired capturing in the ON image. FIG. 9 illustrates the external light, undesired capturing, and reflection in the OFF image. FIG. 10 illustrates the survey result information. In FIG. 5, it is assumed that the biometric authentication device is installed in the place where the biometric authentication is performed on a user, and an evaluation target is set in the casing of the capture unit.

As illustrated in FIG. 5, the capture control unit 21 first turns on the illumination by the illumination unit 163 and captures the evaluation target as a first ON image (S101), and then turns off the illumination and captures the evaluation target as the first OFF image (S102). When there is no external light, undesired capturing, or reflection, the ON image as an image captured when the illumination is turned on is illustrated in FIG. 6, and the OFF image as an image captured when the illumination is turned off is illustrated in FIG. 7. These ON and OFF images illustrated in FIGS. 6 and 7 are appropriate for the biometric authentication. On the other hand, when there is external light, undesired capturing, or reflection, the ON image can be illustrated as FIG. 8, and the OFF image can be illustrated as FIG. 9.

Next, the mask acquisition unit 22 acquires an evaluation mask from the non-volatile memory 12 (S103), and the first calculation unit 23 calculates the reflection score based on the first OFF image and the evaluation mask (S104). In particular, the first calculation unit 23 calculates an average of the brightness of the 5% pixels in descending order of the brightness of the pixels within the evaluation mask area in the first OFF image, compares the average with the first threshold, and determines the reflection score based on the comparison result. In the present embodiment, the brightness is expressed by 256 scales of 0 through 255. Relating to the brightness, the first threshold has two values of 40 and 70. The reflection score is A when the average of the brightness is less than 40, B when it is equal to or more than 40 and less than 70, and C when it is equal to or more than 70. A indicates no reflection, B indicates reflection detected, and C indicates reflection higher than B. Other scores are also expressed by three stages of A through C.

Next, the second calculation unit 24 calculates the external light score based on the first ON image and the first OFF image (S105). In particular, the second calculation unit 24 calculates an average of the 5% pixels in descending order of the brightness of the pixels in the area outside the evaluation mask area in the first ON image and the first OFF image, compares the average with the second threshold, and determines the external light score based on the comparison result. In the present embodiment, the second threshold has two values of 60 and 80. The external light score is A when the brightness average is less than 60, B when it is equal to or more than 60 and less than 80, and C when it is equal to or more than 80. A indicates no external light, B indicates the existence of external light, and C indicates the external light higher than B.

Next, the setting unit 25 adjusts the sensitivity of the sensor 164 and the quantity of illumination light of the illumination unit 163 based on the calculated reflection score and external light score (S106). After the adjustment, the capture control unit 21 turns on the illumination by the illumination unit 163 and captures the evaluation target as the second ON image (S107), and next turns off the illumination and captures the evaluation target as the second OFF image (S108). Then, the capture control unit 21 determines whether or not a specified time has passed since the second OFF image was captured (S109).

When the specified time has passed (YES in S109), the capture control unit 21 turns on the illumination by the illumination unit 163 and captures the evaluation target as the third ON image (S110), and next turns off the illumination and captures the evaluation target as the third OFF image (S111). Next, the third calculation unit 26 calculates the external light fluctuation score based on the second ON image, the second OFF image, the third ON image, and the third OFF image (S112). In particular, relating to the brightness, the second calculation unit 24 compares the second ON image with the third ON image, and the second OFF image with the third OFF image, and calculates the number of pixels having the brightness difference which is equal to or more than a specified value at the same positions in the pixels outside the target area and not contacting the target area in the two comparing processes above. Furthermore, the third calculation unit 26 compares the number of pixels with the third threshold. In the present embodiment, the third threshold has two values of 1000 and 2000. The external light fluctuation score is A when the number of pixels is less than 1000, B when it is equal to 1000 or more and less than 2000, and C when it is equal to 2000 or more. A indicates no external light fluctuation, B indicates external light fluctuation detected, and C indicates higher external light fluctuation than B.

Next, the fourth calculation unit 27 calculates the undesired capturing score based on the second ON image, the second OFF image, the third ON image, and the third OFF image (S113). In particular, relating to the brightness, the fourth calculation unit 27 compares the second ON image with the second OFF image, and the third ON image with the third OFF image, and calculates the number of pixels having the brightness difference which is equal to or more than a specified value at the same positions in the pixels outside the target area and contacting the target area in the two comparing processes above. Furthermore, the fourth calculation unit 27 compares the number of pixels with the fourth threshold. In the present embodiment, the fourth threshold has two values of 1000 and 2000. The undesired capturing score is A when the number of pixels is less than 1000, B when it is equal to 1000 or more and less than 2000, and C when it is equal to 2000 or more. A indicates no undesired capturing, B indicates undesired capturing detected, and C indicates higher undesired capturing than B.

Next, the score recording unit 28 records the calculated reflection score, external light score, external light fluctuation score, and undesired capturing score as the survey result information as illustrated in FIG. 10 in the non-volatile memory 12 (S114). Relating to the external light and the undesired capturing, the score recording unit 28 can record the position of the pixel exceeding the threshold as the survey result information. After the recording process, the score display unit 29 displays the reflection score, the external light score, the external light fluctuation score, and the undesired capturing score on the display 13 according to the survey result information (S115). In addition, when there is an item having a low score, the score display unit 29 displays a message requesting an improvement on the display 13. The score display unit 29 can also display the positions of the external light and the undesired capturing on the display 13.

In step S109, when the specified time has not passed (NO in S109), the capture control unit 21 determines again whether or not the specified time has passed, and passes control to the next step (S110).

As described above, according to the present embodiment, the influence of the fluctuation from the biological feature can be excluded in the survey of the installation environment using the evaluation target. In addition, according to the present embodiment, the area of the palm to be authenticated can be more correctly discriminated from the other areas using the evaluation mask approximating the evaluation target. Therefore, a more correct value can be calculated relating to the survey of the installation environment. In the present embodiment, the biometric authentication device 1 is to authenticate the vein of a palm, but it is also to perform other biometric authentication. In addition, each score is expressed by three stages of A through C, but can be expressed by any number of stages so far as it is expressed by two or more stages. When there are two stages for each score, it indicates whether or not the light other than the light illuminated by the illumination unit 163 (illumination light) has been detected. That is, the first calculation unit 23, the second calculation unit 24, the third calculation unit 26, and the fourth calculation unit 27 according to the present embodiment detect the light other than the illumination light and calculate the level of the detected light.

Figure 11:
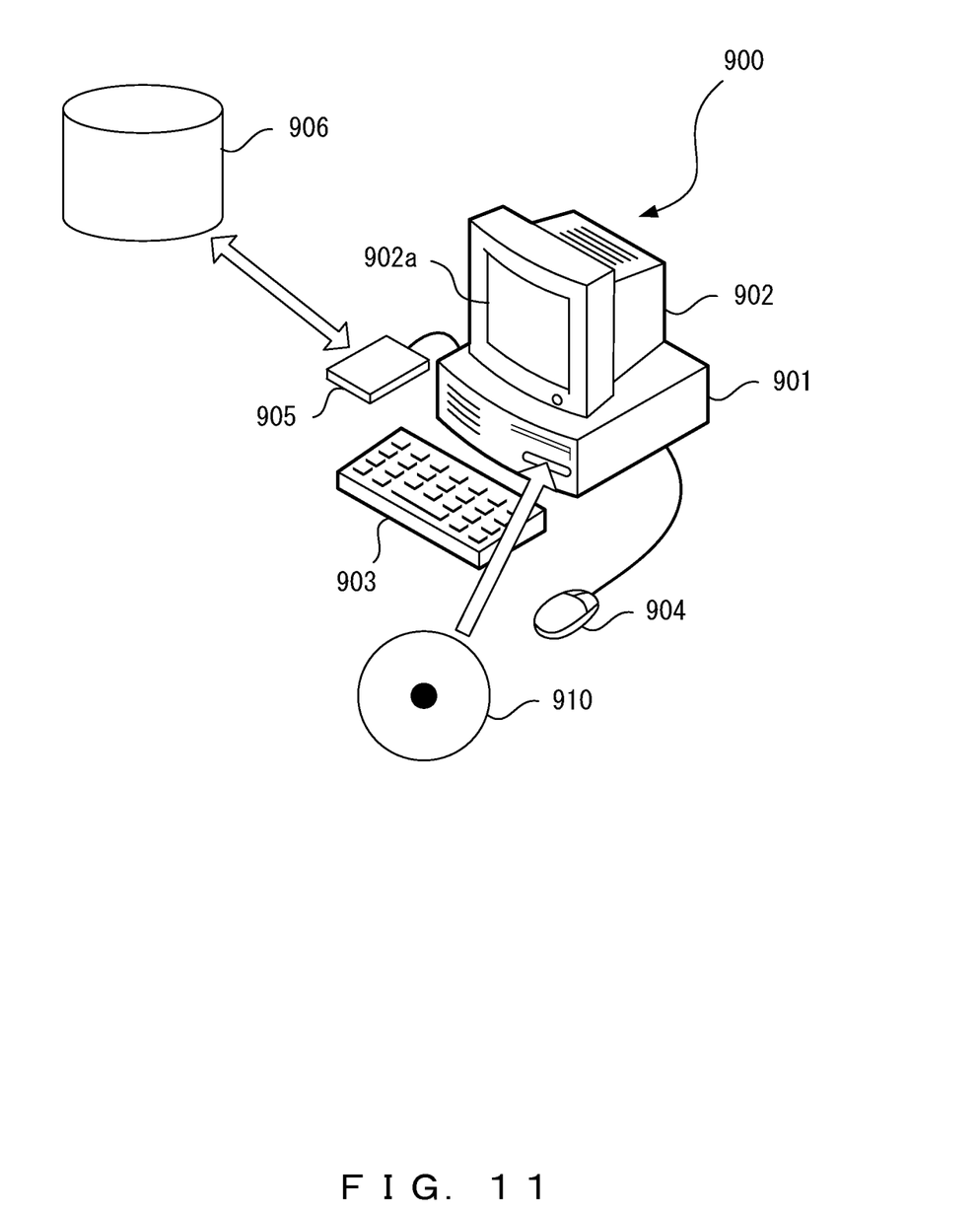
FIG. 11 is an example of a computer system.

The technology disclosed by the present specification can be applied in the computer system described below by connecting biometric authentication equipment. FIG. 11 is an example of a computer system to which the technology disclosed in the present specification is applied. A computer system 900 illustrated in FIG. 11 includes a body unit 901 containing a CPU, a disk drive, etc., a display 902 for displaying an image at an instruction from the body unit 901, a keyboard 903 for inputting various types of information to the computer system 900, a mouse 904 for specifying any position on a display screen 902a of the display 902, and a communication device 905 for accessing an external database etc. to download a program etc. stored in another computer system. The communication device 905 can be a network communication card, a modem, etc.

A program for directing the above-mentioned computer system to execute each of the above-mentioned steps can be provided as a biometric authentication program. The program can be executed by a computer system configuring a biometric authentication device by storing the program in a recording medium readable by a computer system. The program for executing each of the above-mentioned steps is stored in a portable recording medium such as a disk 910 etc. or downloaded from a recording medium 906 of another computer system by the communication device 905. In addition, the biometric authentication program (biometric authentication software) which assigns at least the biometric authentication function to the computer system 900 is input to the computer system 900 and compiled. The program operates the computer system 900 as a biometric authentication device having the biometric authentication function. In addition, the program can be stored in a computer readable recording medium such as the disk 910 etc. The recording medium readable by the computer system 900 can be a built-in storage device in a computer such as ROM, RAM, etc., a portable storage medium such as the disk 910, a flexible disk, a DVD disk, a magnetic optical disk, an IC card, etc., a database holding a computer program, other computer systems and their databases, and various recording media accessible by a computer system connected through a communication device such as the communication device 905.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric authentication device that authenticates a user using a biological feature of the user, the biometric authentication device comprising:
   an illumination device configured to emit light toward a target which represents the biological feature;
   an image sensor configured to obtain a first captured image by capturing the target illuminated by the illumination device, and obtain a second captured image by capturing the target not illuminated by the illumination device;
   a processor configured to acquire from a storage a mask which has a target area approximating a shape of the target in the first and second captured images obtained by the image sensor, and to detect light other than the light emitted by the illumination device based on the acquired mask and at least one of the first and second images.

2. The biometric authentication device according to claim 1, wherein the processor detects incident light which directly enters the image sensor in the light other than the light emitted by the illumination device based on brightness of an area other than the target area in the first and second captured images.

3. The biometric authentication device according to claim 2, wherein the processor detects a fluctuation of the incident light based on the first and second captured images and first and second captured images captured with timing different from timing of the first and second captured images.

4. The biometric authentication device according to claim 1, wherein the processor detects light which enters the image sensor by being reflected by the target in the light other than the light emitted by the illumination device based on brightness in the target area in the second captured image.

5. The device according to claim 1, wherein the processor detects light which enters the image sensor by being reflected by an object other than the target in light other than the light emitted by the illumination device based on brightness of pixels outside the target area and contacting the target area in the first and second captured images.

6. A non-transitory computer-readable recording medium having stored therein a biometric authentication program for causing a computer to execute a procedure, the procedure comprising:
   illuminating by an illumination unit a target which represents the biological feature;
   obtaining by an image sensor a first captured image by capturing the target illuminated by the illumination unit, and obtaining a second captured image by capturing the target not illuminated by the illumination unit;
   acquiring from a storage unit a mask which has a target area approximating a shape of the target in the first and second captured images; and
   detecting light other than illumination light illuminated by the illumination unit based on the acquired mask and at least one of the first and second images.

7. The non-transitory computer-readable recording medium according to claim 6, wherein the detecting includes detecting incident light which directly enters the image sensor in the light other than the illumination light based on brightness of an area other than the target area in the first and second captured images.

8. The non-transitory computer-readable recording medium according to claim 7, wherein the detecting including detecting a fluctuation of the incident light based on the first and second captured images and first and second captured images captured with timing different from timing of the first and second captured images.

9. The non-transitory computer-readable recording medium according to claim 6, wherein the detecting includes detecting light which enters the image sensor by being reflected by the target in the light other than the illumination light based on brightness in the target area in the second captured image.

10. The non-transitory computer-readable recording medium according to claim 6, wherein the detecting includes detecting light which enters the image sensor by being reflected by an object other than the target in light other than the illumination light based on brightness of pixels outside the target area and contacting the target area in the first and second captured images.

11. A biometric authentication method for causing a computer to authenticate a user using a biological feature of the user, the biometric authentication method comprising:
    illuminating by an illumination unit a target which represents the biological features;
    obtaining by an image sensor a first captured image by capturing the target illuminated by the illumination unit, and obtaining a second captured image by capturing the target not illuminated by the illumination unit;
    acquiring from a storage unit a mask which has a target area approximating a shape of the target in the first and second captured images; and
    detecting light other than illumination light illuminated by the illumination unit based on the acquired mask and at least one of the first and second images.

12. The biometric authentication method according to claim 11, wherein the detecting includes detecting incident light which directly enters the image sensor in the light other than the illumination light based on brightness of an area other than the target area in the first and second captured images.

13. The biometric authentication method according to claim 12, wherein the detecting includes detecting a fluctuation of the incident light based on the first and second captured images and first and second captured images captured with timing different from timing of the first and second captured images.

14. The biometric authentication method according to claim 11, wherein the detecting includes detecting light which enters the image sensor by being reflected by the target in the light other than the illumination light based on brightness in the target area in the second captured image.

15. The biometric authentication method according to claim 11, wherein the detecting includes detecting light enters the image sensor by being reflected by an object other than the target in light other than the illumination light based on brightness of pixels outside the target area and contacting the target area in the first and second captured images.

* * * * *